April 12, 1932.   G. M. BELLANCA   1,853,492
STRUT CONSTRUCTION
Filed June 7, 1930
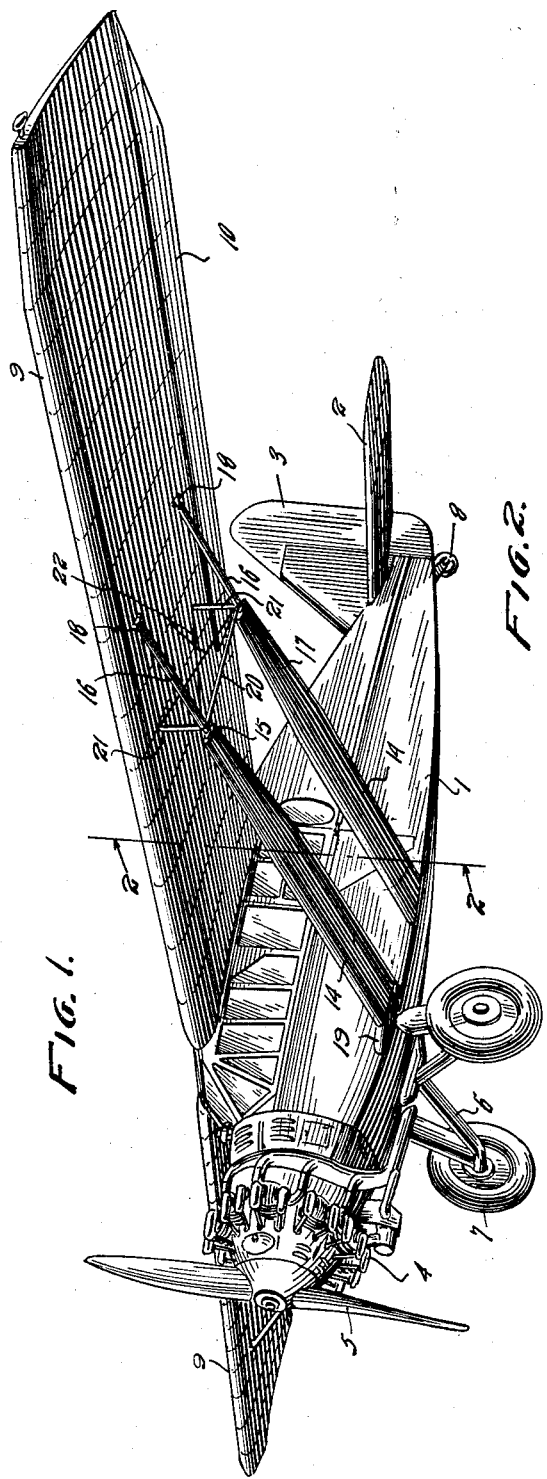
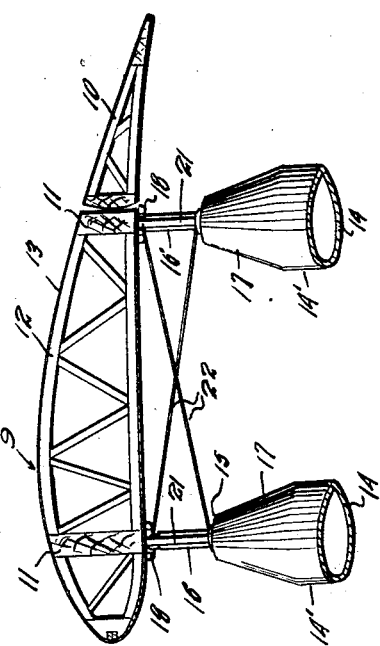
Inventor
GIUSEPPE M. BELLANCA
By Semmes & Semmes
Attorneys Patented Apr. 12, 1932

1,853,492

UNITED STATES PATENT OFFICE

GIUSEPPE M. BELLANCA, OF NEW CASTLE, DELAWARE

STRUT CONSTRUCTION

Application filed June 7, 1930. Serial No. 459,748.

The invention relates to airplanes and more particularly has reference to a strut therefor.

In the past struts or compression members employed for bracing between the wing surfaces of an airplane or between a wing surface and the fuselage have generally been given a circular cross section. In some instances a strut of this type has had a fairing added thereto so as to produce a stream lined section. Other constructions have also been employed for effecting such a section. However, but little attention has been given to forming a strut of sufficient size and such shape as to provide a lifting surface, the art considering chiefly the advantage of eliminating parasitic resistance by stream lining the struts and making them of as small a cross section as is structurally feasible.

The major object of this invention is the provision of an airplane strut provided with a lifting surface.

An equally important object of the invention is the designing of a construction allowing a plurality of struts provided with lifting surfaces to be attached to a wing of an airplane for the purpose of supporting the same.

Another object of the invention is the designing of an airplane strut having a lifting surface portion to which is secured an extension column member.

Still another object of the invention is the provision of an airplane strut having a lifting surface portion of an airfoil section, a stream lined extension column member being secured to the lifting portion of the strut.

Yet another object of the invention is the designing of an airplane strut having a lifting surface portion adapted to be connected to the fuselage of a plane and an extension column member connected to a wing of the plane, the lifting surface of the strut being so positioned with respect to the wing of the plane with which it is associated as to substantially prevent interference between air currents adjacent said wing and the lifting surface.

A further object of the invention is the provision of a plurality of struts provided with lifting surfaces, the struts being connected to the fuselage and a wing of the plane and positioned in tandem relation one behind the other.

Still a further object of the invention is the provision of a design allowing the use of a plurality of lift struts, the struts being positioned in tandem from the leading to the trailing edge of the wing on each side of the fuselage, each strut being connected to the fuselage and the wing, the struts adjacent the wing being additionally supported by a cross frame which also ties the struts together.

Still another object of the invention is the provision of a truss framework whereby the wing supporting end of a strut may be spaced from the wing surface and interference of air currents prevented.

With these and other objects in view, which may be incident to my improvements, the invention consists in the parts and combinations to be hereinafter set forth and claimed, with the understanding that the several necessary elements comprising my invention may be varied in construction, proportions and arrangement without departing from the spirit and scope of the appended claims.

The invention comprehends the provision of a novel strut or a compression member for supporting the wings of an airplane, and also includes the positioning of a plurality of struts in tandem, one behind the other. One method of practically effecting the concept of the invention is the provision of a strut having an elongated lifting surface portion adapted to be connected to the fuselage of the plane. To the lifting surface portion is secured an extension column member which is also connected to the wing with which the strut is associated.

In use the struts on the same side of the fuselage are positioned parallel to each other and have their upper ends connected to the wing surface along the same chord of the wing and their lower ends connected to the fuselage. For the purpose of strongly supporting the struts and tying them together, a novel cross frame construction which is connected to the extension column members and the wing is employed.

In order to make my invention more clearly understood, I have shown in the accompanying drawings, means for carrying the same into practical effect without limiting the improvements in their useful applications to the particular constructions which, for the purpose of explanation, have been made the subject of illustration.

In the drawings:

Figure 1 is a perspective view of an airplane having the struts forming the subject matter of the invention employed thereon.

Figure 2 is a partial sectional elevation taken along the line 2—2 of Figure 1 and shows in detail the connection of the struts to the wing.

Throughout the drawings similar reference numerals refer to like parts in the different views. Shown in Figure 1 is an airplane having a fuselage 1, of the cabin type, upon which is provided the customary tail surfaces 2, and rudder 3. The plane is driven by a suitable motor 4 to which is connected a propeller 5. Secured to the lower part of the fuselage is a landing gear 6, of any convenient design, provided with wheels 7. A tail skid 8 is also disclosed. Mounted upon the fuselage is a wing 9 provided with ailerons 10.

Wing 9 may be of any desired airfoil section and is formed of the usual spars 11, ribs 12, and surfacing material 13. The wing construction may be one of the all-metal type or the ribs and spars may be formed of wood and a suitable fabric covering material employed.

For the purpose of supporting the wing 9, I have disclosed a novel form of strut which comprises a lifting surface portion 14 having an airfoil section (Figure 2) of any desired type to the end 15 of which is secured an extension column member 16.

The lifting surface portion 14 of each strut is formed of a spar and rib construction, which for the purpose of simplifying the drawings has been omitted. Upon the spar and rib construction just mentioned, there is placed suitable surfacing or covering material 14'.

There is secured to the end 15 of the lifting surface portion of each strut, as previously pointed out, an extension column member 16. The extension column member 16 is so positioned upon the lifting surface portion that the center of gravity of its cross section coincides with the center of gravity of the cross section of the lifting section portion, thus preventing the load transmitted to the lifting surface portion through the extension column member from being applied eccentrically. As may be observed in Figure 1, each column member possesses a relatively small cross section, when compared with that of the lifting surface portion of the strut.

It is also to be observed that the extension column members are stream lined.

It should be noted that the end of the lifting surface portion of each strut, adjacent its extension column, has an outward taper 17. Thus it may be observed that the end 15 of the lifting surface portion possesses a smaller cross section than the main body of the lifting surface. Because of the taper just mentioned, the cross sectional area of the lifting surface portion progressively increases from a minimum at its end 15 to a maximum where the taper joins the main body of the lifting surface.

In positioning the struts so that they may function as compression members for supporting the wing, the end of each extension member is secured to the wing of the plane, while the free end of the lifting surface portion is connected to the fuselage. The struts are arranged in pairs on opposite sides of the fuselage, although more than two on each side of the wing may be employed if desired. Thus there is provided a forward strut and a rearward strut for each semi-span of the wing, which have their upper or extension column ends connected to the wing along the same wing chord. The free end of each extension column member 12 is secured to a suitable fitting 18 which is attached to one of the spars of the wing. A short stub wing 19, of any suitable airfoil design, is mounted upon each side of the fuselage adjacent the landing carriage, and to this the free end of the lifting surface of the forward strut is secured. As shown in the drawings, the free end of the lifting surface of the rearward strut is attached directly to the lower portion of the fuselage without the use of a stub wing.

It is to be understood, however, that the free ends of the lifting surface portions of both struts may be directly connected to the fuselage or connected thereto through the medium of a stub wing. In some instances it may be desirable to connect the free end of the lifting surface of the forward strut to the landing gear of the plane. Such practice, it is to be understood, may be followed without departing from the spirit of the invention or the scope of the appended claims.

While each of the lift struts has been shown positioned so as to have the same angle of incidence, it is understood that this need not necessarily be followed. For example, the angle of incidence of each lift strut may be of the same or different sign and likewise of different degree. Preferably the angle of incidence of each lift strut is less than that of the main wing. It is to be understood, however, that a greater angle of incidence may be given to the lift strut than to the main wing without departing from the spirit of the invention or the scope of the appended claims. While struts on the same side of the fuselage have been disclosed as substantially parallel to each other this arrangement may be varied so that the rearward strut may be connected to the fuselage at a point nearer the tail of the airplane than is shown. By such a construction, an exceedingly strong support having the effect of an A-frame for the wings would be provided.

As is well known the load on the semi-span of a wing increases for increased angles of attack. The resultant of this load on the semi-wing span consequently changes its position with respect to the fuselage of the plane to which the semi-span is connected. As the angle of attack increases, the lateral center of pressure through which the resultant load passes, moves outwardly towards the wing tips, and as the angle of attack decreases it moves inwardly towards the fuselage of the airplane. The lateral center of pressure thus has a range of travel and it is within this zone that the extension column members are connected to the wing.

Hence it will be appreciated that the length of the entire strut, that is the lifting surface portion and the extension column member, is determined by the location of the range of travel of the lateral center of pressure on the semi-wing span and the point at which the strut is connected to the fuselage. In this manner it will be appreciated that each strut is positioned at such a point so as to take the resultant load directly and hence strengthen the wing at the greatest point of load thrust.

Of course, if desired the extension column members may be connected to the wing at a point nearer the tips and without the range of center of pressure travel. By this construction a greater lifting surface would be provided for the struts.

It has been mentioned as one of the objects of the invention to provide a novel bracing and tie construction for the struts. This construction is well shown in both Figures 1 and 2 and comprises a horizontal tie rod 20, the ends of which are secured, in any convenient manner, to each of the extension column members of the struts. The tie rod 20 is substantially parallel to the wings and is positioned adjacent the tapered end 15 of the lifting surface of each strut. Also connected to each extension column member, adjacent the cross tie 20, is a vertical hanger or column 21. The upper end of each column 21 is suitably secured to the wing. This connection may be made through means of a fitting if desired.

For providing further bracing to the construction just described, crossed tie wires 22 are employed. These wires are connected adjacent the wing surface to the vertical hanger 21 and have their other ends secured to the lower end of the opposite hanger. In effect they provide diagonal tension members of a truss construction and are placed under tension before having their ends secured as described.

All of the members of the tie frame construction just described, may be suitably stream lined so as to reduce parasitic resistance.

Each extension column member may be formed integral with its lifting surface portion if desired. Also it may be constructed of the same material as the spars and ribs of the lifting surface portion. However, in some instances, metal tubular construction is preferred, although it is to be understood that I-beams, T-beams, built up box girders, or other structural beams and forms may be employed if desired. In the latter instance, the extension column members may be covered with suitable fabric and stream lined or any other method of stream lining may be employed.

The spars and ribs of the lifting surfaces of the struts are constructed of wood or metal as desired. Fabric surfacing material or metal may be used for covering the framework formed by the spars and ribs.

The advantages to be derived from a strut of this construction will at once be apparent. Besides affording compression members for the support of the wing, an additional lifting surface is provided. This increase in lifting surface is accompanied without the loss of efficiency of the airplane, which occurs in a triplane or biplane having the same wing surface area as a monoplane, due to the interference of air currents passing adjacent to upper and lower wings.

By the use of extension column members which allow the airfoil section of the strut to be stopped a considerable distance below the bottom surface of the wing, interference of air currents adjacent the lifting surface of the struts and the wing is substantially prevented. This interference is further prevented by providing the tapered portion 17 near the end of the lifting surface of each strut.

Another feature of the lift strut construction resides in the fact that their use increases the stability of the airplane. The resultant lift on the lifting surface portion of each strut is normal to the strut. It will be appreciated that when the lines of resultant lift for similar sections on struts directly opposite each other on different sides of the fuselage are drawn, they will intersect each other above the fuselage. This point, it will be appreciated is above the center of gravity of the airplane. Hence there is always a positive force tending to prevent the ship from losing lateral stability or to prevent it from rolling.

The resultant lift on the struts also tends to prevent the ship from pitching downwardly and aids in controlling its longitudinal stability. Besides the effect of aiding the longitudinal stability the struts are of benefit in that they may be so positioned as to allow the plane to climb at an increased angle of attack.

The construction also affords strong and rigidly braced compression members which are of comparatively light weight. Because of the fact that the extension columns are so positioned with respect to the lifting surface of the struts that the center of gravity of these two members coincide, eccentric loading of the lifting surface, due to the load transmitted thereto through the extension column is prevented. By reason of the tie bracing between the struts, bending of the wing as well as the struts themselves, due to a turning moment or a torsion effect is prevented. Such bending is further prevented by the rigid A frame construction formed by the wing, struts, and fuselage. It should be noted that the struts are connected to the principal members of the wing, that is, the principal spars thereof which carry the greatest part of the load upon the wing. Thus it will be appreciated that the load carried on the main spar is transmitted directly to the struts and not through the medium of intermediate members.

While the invention has been shown as applied to a monoplane of the cabin type, it will be understood that the invention may be associated with other types of monoplanes as well as biplanes and triplanes. When a multi-wing ship has the strut construction forming the subject matter of this invention employed therewith, the struts may be either connected to the fuselage or to the upper wing surface of a lower plane.

From the foregoing description it will be appreciated that I have provided a novel strut construction for an airplane which not only provides compression members for supporting the wing, but also affords a lifting surface portion whereby the effective wing area of the plane is increased. It is also to be observed that a strong and rigid bracing for the struts of the invention when arranged in tandem relation has been devised. With the use of struts in tandem not only is the stability of the plane greatly increased but a more rigid and stronger support for the wing surfacing is provided.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. In an airplane a plurality of struts for each wing thereof, each of said struts being formed with a lifting surface portion having secured thereto an extension column member, the lifting surface of one strut being connected directly to the fuselage of the plane, the other being connected to a stub wing mounted on the fuselage of the plane, the extension column of each strut being connected to a spar of the wing with which the strut is associated and cross bracing between the struts connected to the wing.

2. An airfoil strut comprising a lifting surface portion and an extension column member secured thereto, said lifting surface portion having an airfoil section formed of rib and spar construction with surfacing material therefor, said extension column member being stream lined, the lifting surface of the strut adapted to be connected to a stub wing monuted on the fuselage of an airplane and the extension column member adapted to be secured to a wing of the airplane.

3. In an airplane a plurality of struts for supporting a wing thereof, each of said struts provided with a lifting surface portion having an extension column member secured to the end thereof, the struts on each side of the fuselage being positioned in tandem one behind the other, the extension column members of each strut being connected to the wing along the same chord and, the lift surface portions of the forward strut being connected to a stub wing mounted on the fuselage of the plane and the other being connected directly to the fuselage.

In testimony whereof I affix my signature.
GIUSEPPE M. BELLANCA.